United States Patent
Bryant et al.

(10) Patent No.: US 6,405,367 B1
(45) Date of Patent: *Jun. 11, 2002

(54) APPARATUS AND METHOD FOR INCREASING THE PERFORMANCE OF JAVA PROGRAMS RUNNING ON A SERVER

(75) Inventors: Craig W. Bryant, Fort Collins; Todd M. Goin, Loveland; Thomas J. Moos, Windsor; Douglas W. Steele, Fort Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/092,236

(22) Filed: Jun. 5, 1998

(51) Int. Cl.$^7$ ............................................... G06F 9/445
(52) U.S. Cl. ....................................... 717/115; 717/136
(58) Field of Search ........................... 709/1, 203, 228, 709/321; 717/5, 115, 136

(56) References Cited

U.S. PATENT DOCUMENTS

| | | | |
|---|---|---|---|
| 5,452,460 A | * 9/1995 | Distelberg et al. | 709/302 |
| 5,828,840 A | * 10/1998 | Cowan et al. | 709/203 |
| 5,870,550 A | * 2/1999 | Wesinger, Jr. et al. | 709/218 |
| 5,913,024 A | * 6/1999 | Green et al. | 713/200 |
| 5,961,586 A | * 10/1999 | Pedersen | 709/201 |
| 5,970,249 A | 10/1999 | Holzle et al. | 717/153 |
| 6,029,201 A | * 2/2000 | Neill | 709/228 |
| 6,301,590 B1 | * 10/2001 | Siow et al. | 707/500 |

OTHER PUBLICATIONS

Girdley et al. "Web Programming with Java", 1996, pp. 339–341.*
Stevens, "Unix Network Programming", 1990, pp. 55–71.*
Lemay et al. "Teach Yourself Java in 21 Days", 1996.*

* cited by examiner

Primary Examiner—St. John Courtenay, III
Assistant Examiner—Van H. Nguyen

(57) ABSTRACT

An apparatus and method provide for the execution of object-oriented languages, and more particularly increase the performance of Java application execution. The performance increase of Java application execution is achieved by first moving the Java application code into a Java server. The Java server utilizes the application code and functions as a library of classes and methods. The Java server is accessed by an object file (proxy), that is setup to access the correct Java server process. Next, when an application is to be executed, the object file calls the Java server process that forks itself and then has the child server run the already loaded classes and methods. Thus, the Java classes and methods are loaded only once when the Java virtual machine is started. With large classes and methods, it is faster to connect up to the already running Java server and have the already running Java server fork a child server to execute the correct classes and methods than it is to start and load the Java virtual machine, and execute the original classes and methods.

16 Claims, 9 Drawing Sheets

APPARATUS AND METHOD FOR INCREASING THE PERFORMANCE OF JAVA PROGRAMS RUNNING ON A SERVER

BACKGROUND OF THE INVENTION

1. Field of the Invention

The present invention generally relates to the execution of interpreted languages, and more particularly, to increasing the performance of Java interpreted language execution in application software.

2. Description of Related Art

As known in the art, the Internet is a world-wide collection of networks and gateways that use the TCP/IP suite of protocols to communicate with one another. At the heart of the Internet is a backbone of high speed data communication lines between major nodes or host computers consisting of thousands of commercial, government, educational and other computer systems that route data and messages.

The World Wide Web (WWW) refers to the total set of interlinked hypertext documents residing on hypertext transfer protocol (HTTP) servers all around the world. Documents on the WWW, commonly referred to as pages or web pages, are written in hypertext mark-up language (HTML) identified by uniform resource locators (URL) that specify the particular machine and pathname by which a file can be accessed and transmitted from node to node to the end user under HTTP. A web site is a related group of these documents and associated files, scripts, subprocedures, and databases that are served up by an HTTP server on the WWW.

Users need a browser program and an Internet connection to access a web site. Browser programs, commonly referred to as "web browsers," are client applications that enable a user to navigate the Internet and view HTML documents on the WWW, another network, or the user's computer. Web browsers also allow users to follow codes called tags that are embedded in an HTML document, which associate particular words and images in the document with URLs so that a user can access another file that may be at any location around the world, at the press of a key or the click of a mouse. These files may contain text (in a variety of fonts and styles), graphic images, movie files and sounds as well as Java applications, other scripted languages, active X-controls or other small embedded software programs that execute when the user activates them by clicking on a link.

Scripts are applications that are executed by an HTTP server in response to a request by a client user. One type of script is a common gateway interface (CGI) script. Generally, a CGI script is invoked when a user clicks on an element in a web page, such as a link or image. CGI scripts are used to provide interactivity in a Web page. CGI scripts can be written in many languages including Java, C, C++ and Perl. A CGI-BIN is a library of CGI script applications that can be executed by an HTTP server.

Java, originally developed by Sun Microsystems, Inc. is an object-oriented, multithreaded and dynamic language that requires compilation and interpretation for execution. In the context of this document "Java" shall mean "Java" developed by Sun Microsystems, Inc., or any other Java-like language or derivative language developed by any other party. First, a Java application program is compiled into byte-codes by a Java compiler. This language then requires a Java virtual machine (i.e. an interpreter) to translate the compiled byte-code into machine code for a particular central processing unit (CPU) at run-time. Java permits an application (i.e. a program) to be compiled into byte-code once and then interpreted many times.

These Java applications are invoked by the HTTP daemon to do a single job, and then they exit. One problem associated with this process is the amount of time required to start up the Java virtual machine in order to execute the invoked Java application. Furthermore, when the size of the Java class files gets large, the amount of time spent loading the Java code can be a performance limiter, since the Java virtual machine dynamically loads class files only when needed.

The Java virtual machine is further slowed by the loading of all standard system objects (i.e. classes for core language, input/output, threads, applet, GUI event and image processing, security and the like) required for execution. The Java virtual machine allows for the objects to be dynamically loaded for flexibility and provides selectivity of only the objects needed to execute a particular Java application, but penalizes in terms of the speed of the Java application operation.

Until now, the overhead associated with starting the Java virtual machine and loading classes has resulted in the lack of the ability to provide high-performance execution of Java application CGI-BIN programs.

SUMMARY OF THE INVENTION

Although certain objects, advantages, and novel features of the invention are set forth in the description that follows other objects and novel features of the invention will become apparent to those skilled in the art upon examination of the following, or may be learned through the practice of the invention which are not expressly set forth herein.

The present invention is generally directed to an apparatus and method for increasing the performance of Java application execution for tasks requiring fast execution of Java applications using Java language application software. In accordance with the preferred embodiment of the present invention, the invention is accomplished by moving the code that was in the individual Java CGI-BIN script into one Java server daemon process. The individual Java CGI-BIN scripts are replaced by an object file (the proxy) that calls the daemon process to execute the code that would be in the CGI-BIN script on the proxy's behalf. The proxy object file preferably is in C and executes Java code by invoking the Java virtual machine so very minor changes are needed to turn the Java applications into library routines.

The Java server invokes the Java virtual machine and preloads all potentially needed objects files during initialization of the Java virtual machine to speed up the actual execution of a particular Java application. The Java server accomplishes the execution of a particular Java application by forking itself and then having the child Java server run the Java class files in the already loaded Java virtual machine for the specific Java CGI-BIN script.

One of the advantages of doing this is that the Java application code in the Java server process is loaded (i.e. classes and methods) only once by the Java virtual machine when the Java server is started. In accordance with the invention, it has been determined that with large Java scripts, it is faster to connect up to the server and have it fork a child and execute the correct code than it is to start a new Java virtual machine, load the needed class files and execute the correct code.

BRIEF DESCRIPTION OF THE DRAWINGS

The accompanying drawings incorporated in and forming a part of the specification illustrate several aspects of the present invention, and together with the description, serve to explain the principles of the invention in accordance with the preferred embodiment.

DETAILED DESCRIPTION OF THE PREFERRED EMBODIMENT

Reference will now be made in detail to the drawings to specifically describe the present invention. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 1:
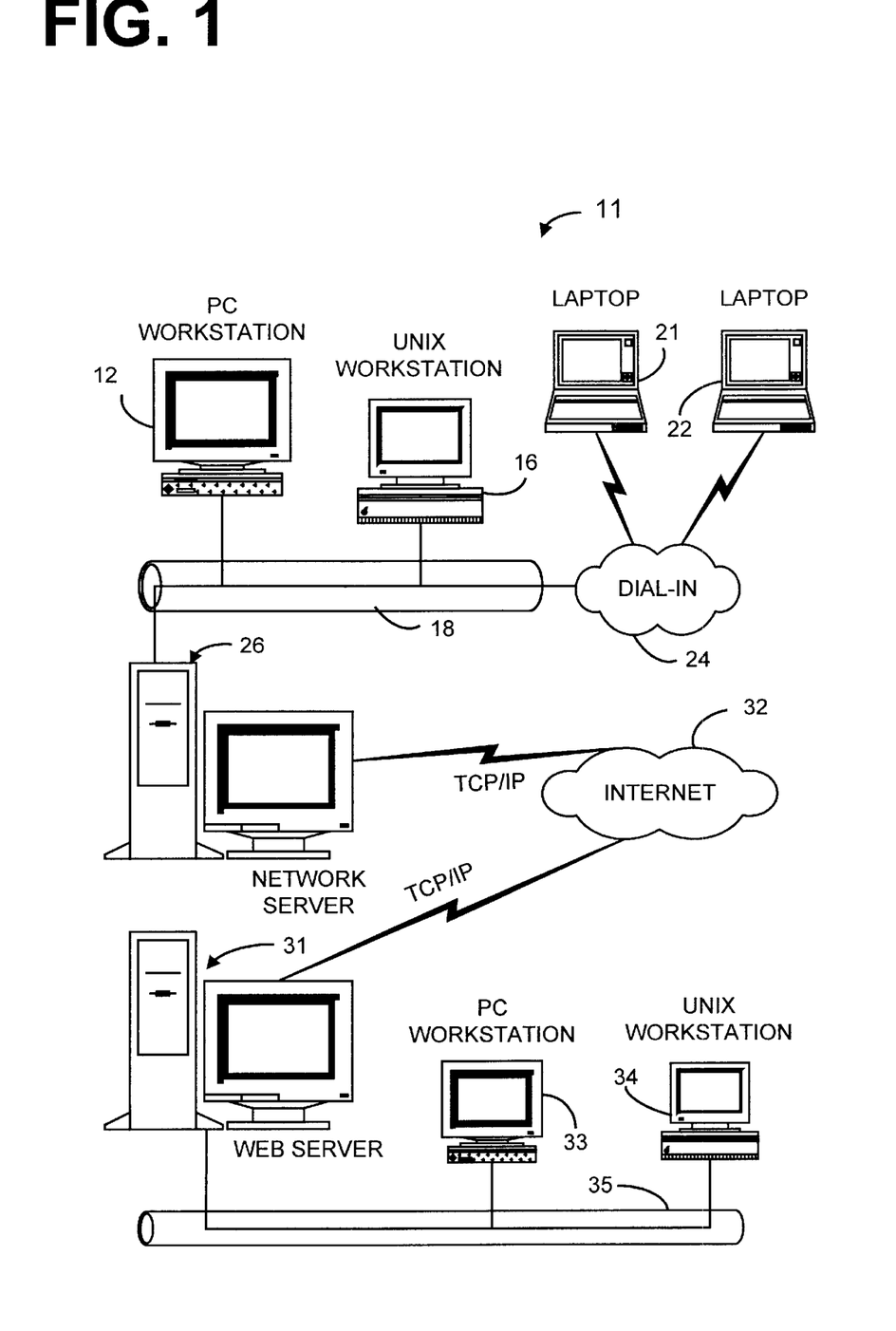
FIG. 1 is a block diagram of the client/server system utilizing the Internet.

Turning now to the drawings, FIG. 1 is a block diagram of one of many possible system configurations that illustrates the flexibility, expandability, and platform independence of the present invention. While the system configuration could take many forms, the diagram of FIG. 1 illustrates a plurality of diverse workstations 12, 14 and 16 directly connected to a network, such as, for example, a LAN 18. Additional workstations 21, 22 may similarly be remotely located and in communication with the network 18 through a dial-in or other type of connection 24. Each of the workstations in FIG. 1 are uniquely illustrated to emphasize that workstations may comprise a diverse hardware platform.

As is well known, browser applications are provided and readily available for a variety of hardware platforms. Browsers are most commonly recognized for their utility for accessing information over the Internet 32. As mentioned above, a browser is a device or platform that allows a user to view a variety of service collections. The browser retrieves information from a web server 31 or network server 26 using HTTP, then interprets HTML code, and formats and displays the interpreted result on a workstation display.

Additional workstations 33 and 34 may similarly be located and in communication with the web servers 31 for access to web pages on the local server and on the Internet 32. Workstations 33 and 34 communicate with the web server 31 via a network 35. Networks 18 and 35 may be, for example, ethernet-type networks, also known as 10 BASE 2, 10 BAS 5, 10 BSAF, 10 BAST, BASE BAN network, CO-EX cable, and the like.

Figure 2:
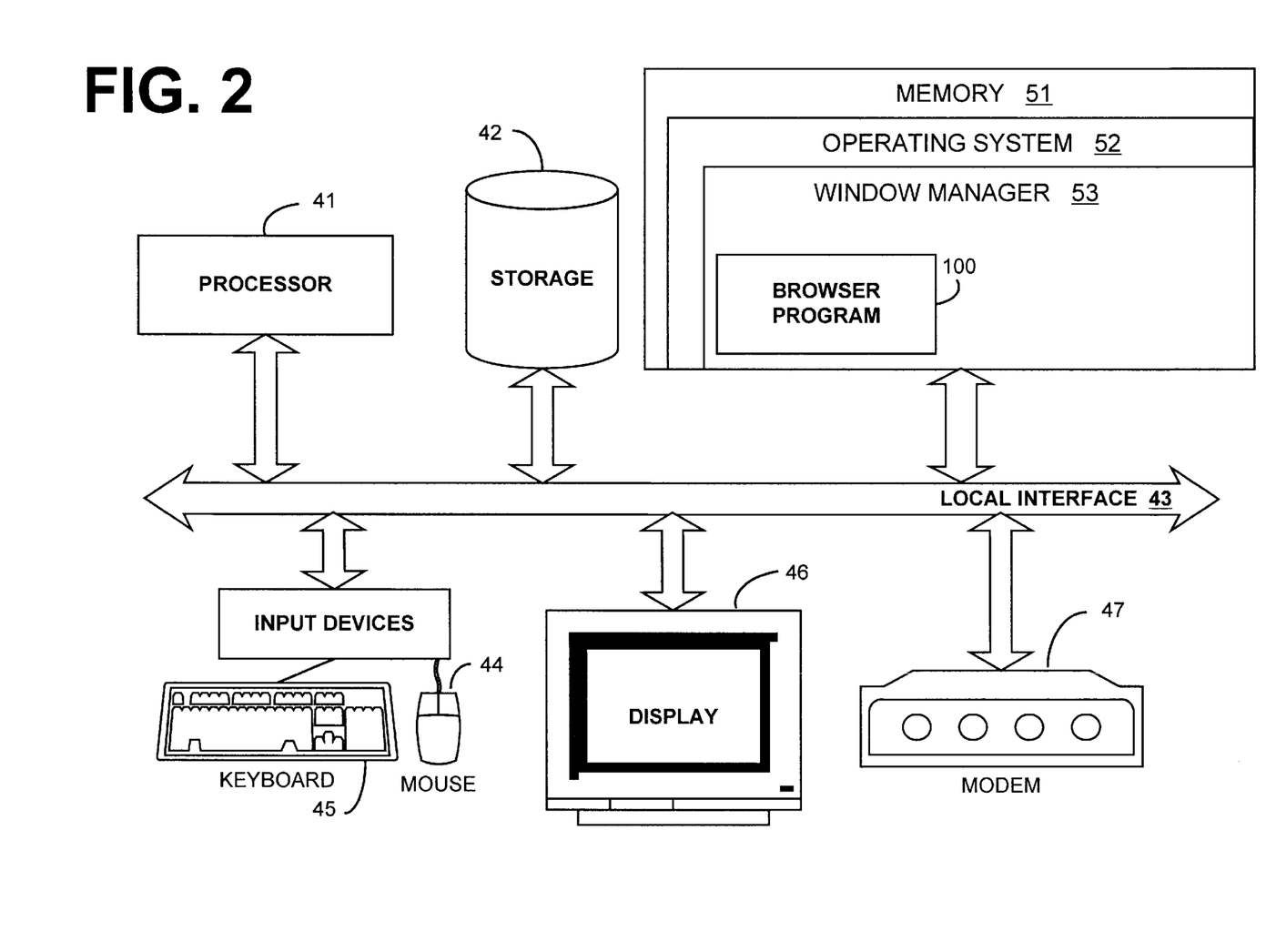
FIG. 2 is a block diagram illustrating a browser program situated within a computer readable medium in a computer system of the client systems, as shown in FIG. 1.

As illustrated in FIG. 2, client systems today generally include only a browser program 100 (e.g., Netscape, Internet Explorer, or other browser program) for use in accessing locations on a network 32. These browser programs 100 reside in computer memory 51, and access a communication facilities utilizing modem or network card 47, to connect the user to other resources connected to the network 32. In order to find a resource, the user must know the network location of the resource denoted by a network location identifier or URL. These identifiers are often cryptic, following very complex schemes and formats in their naming conventions.

Systems today identify, access, and process these resources desired by a user by using the processor 41, storage device 42, and memory 51, which comprises an operating system 52 and window manager 53. The processor 41 accepts data from memory 51 and storage device 42 over the bus 43. Direction from the user can be signaled by using the input devices mouse 44 and keyboard 45. The actions input and result output are displayed on the display terminal 46.

The present invention involves the use of browser program 100 within the client system. The browser program 100 is the software that interacts with the server to obtain the requested data and functionality requested by the client user. The browser program 100 will be described hereinafter in detail with respect to FIGS. 4 and 5.

Figure 3:
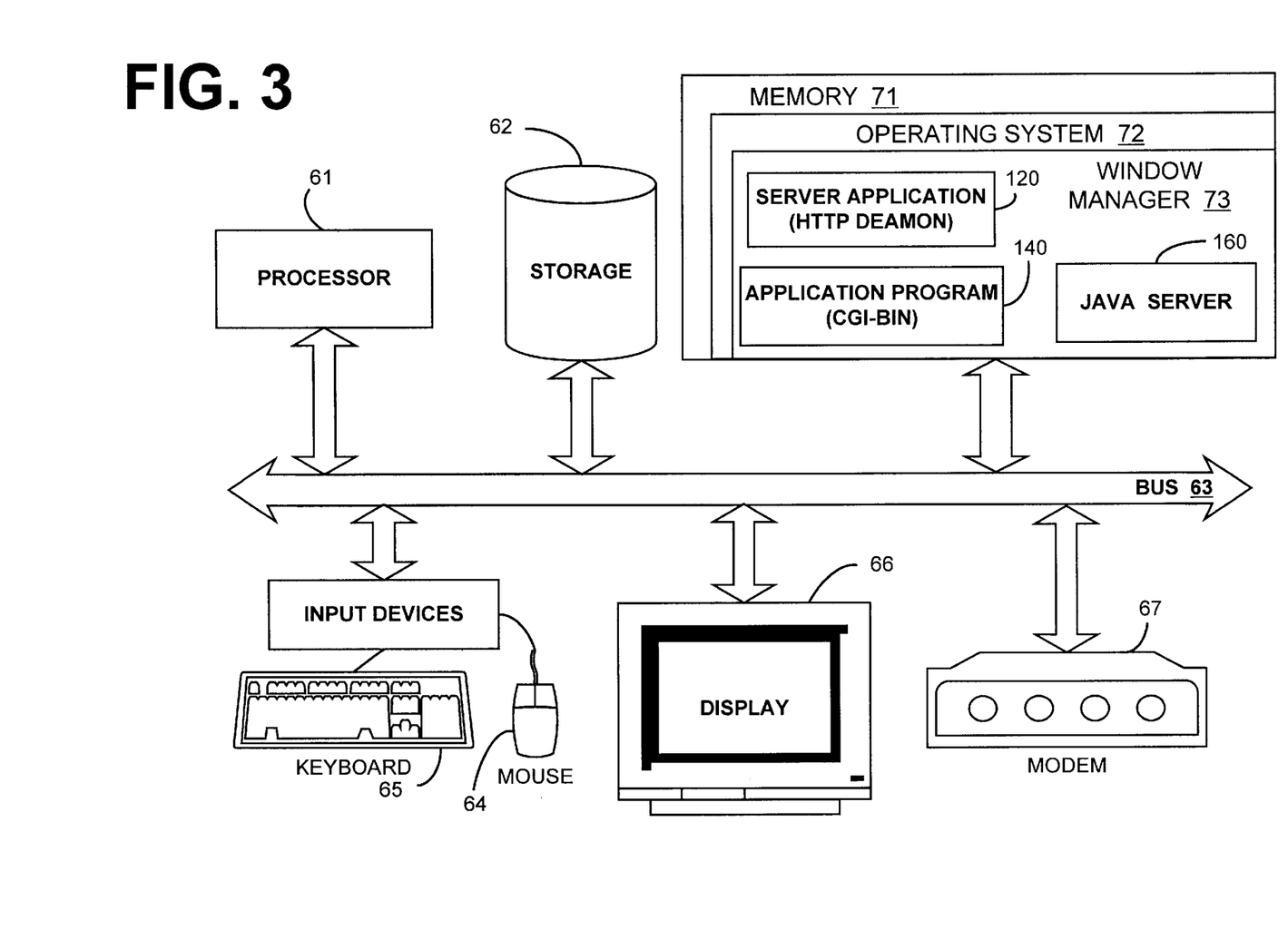
FIG. 3 is a block diagram illustrating a server's service application program, the Java server process and the child Java server process situated within a computer readable medium, for example, in a computer system of the server systems, as shown in FIG. 1.

An example of an architecture of the server systems 26 and 31 is illustrated in FIG. 3. The principal difference between the servers 31 and 10 26 and the clients 12, 16, 21, 22, 33 and 34, illustrated in FIG. 1, is that the clients interface to the user and request the functionality through the browser program 100, while the servers 26 and 31 provide the services requested by the clients 12, 16, 21, 22, 33 and 34 utilizing the server application program 140 and the Java server 160. Otherwise, the functionality of processor 61, storage device 62, mouse 64, keyboard 65, display 66, and the modem or network card 67 are essentially the same as the corresponding items shown in FIG. 2. As is known in the art, the client systems 12, 14, 16, 21, 22, 33 and 34, and the server systems 26 and 31, may reside on the same physical machine.

The memory 71 interacting with the operating system 72 and the window manager 73 provide the services requested by the client utilizing the server application 120, application program 140, and Java server 160. Server application 120, application program 140, and server Java 160 are defined in more detail below with respect to and FIGS. 4, 6, 7, 8 and 9.

Figure 4:
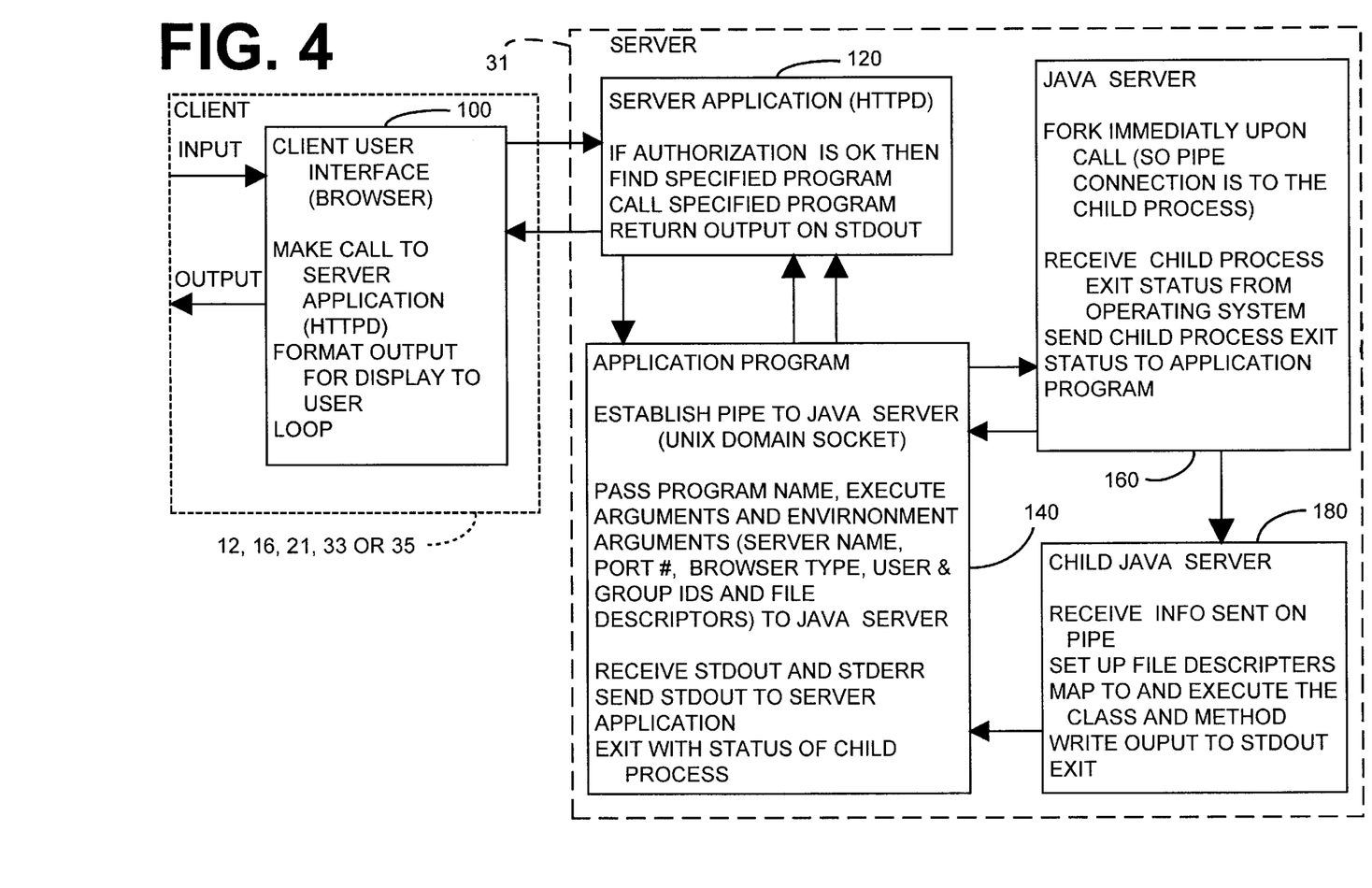
FIG. 4 is a block diagram illustrating the process for client browser, and the server's server application, service application program, the Java server and the child Java server processes, as shown in FIGS. 2 and 3.

With respect to FIG. 4, the client systems 12, 16, 21, 22, 33 or 34 can request services from the web server 31 by utilizing the client system browser program 100. The user interface program of browser program 100 first receives a request from the user. Next, the client system browser program 100 makes a call to the server application 120 to access the requested information. This request for service goes out on a network line to the web server 31 and is received by the server application 120 of the web server.

The server application 120 first determines whether the user is authorized to access a specified program and, if the authorization is satisfied, the server application 120 finds the specified program and calls the specified program by invoking the application program 140 using the program name and arguments.

The application program 140 establishes a pipe to a Java server 160. The application program 140 then passes the program name and executive arguments and environmental arguments on the established pipe to the Java server 160 that are needed to provide the requested service.

Java server 160 forks immediately to create a child Java server 180, upon the establishment of the pipe connection, so that the pipe connection from the application program 140 is connected to both the parent Java server 160 and to the child Java server 180. The child Java server 180 receives the program name execution arguments and environmental arguments sent on the pipe connection, sets up the file descriptors, maps to the requested class and method, executes the class and method, and writes the output to a stdout; which is then returned to application program 140. When the output is sent to the application program 140, the child Java server 180 exits and therefore ceases to exist.

Upon the termination of the process of the child Java server 180, the parent Java server 160 receives the exit status of the child Java server 180 from the operating system 72 and sends the child Java server 180 exit status to application program 140 over the pipe connection. The parent Java server 160 then terminates that pipe connection. Application program 140 receives the output of the child Java server 180 (stdout), the child Java server 180 exit status and error status (stderr), and returns the output and error status to the server application 120. The application program 140 then exits with the same exit status of the child Java server 180. Server application 120 receives the output and error status of the application program 140 and the application program 140 exit status, which is the same as the child Java server process 180, and returns the output and error status over a network 18 or 24 to the browser program 100 of the client system that requested the service. The browser program 100 formats the output for display to the user that requested service in the client system. This process will be further explained below with respect to FIGS. 5 through 9.

In an alternative embodiment, upon the termination of the process of the child Java server 180, the server application 120 receives the output and error status of the child Java server 180 directly from the child Java server 180. The server application 120 then returns the output and error status over a network 18 or 24 to the browser program 100 of the client system that requested the service and continues the process as described above.

Figure 5:
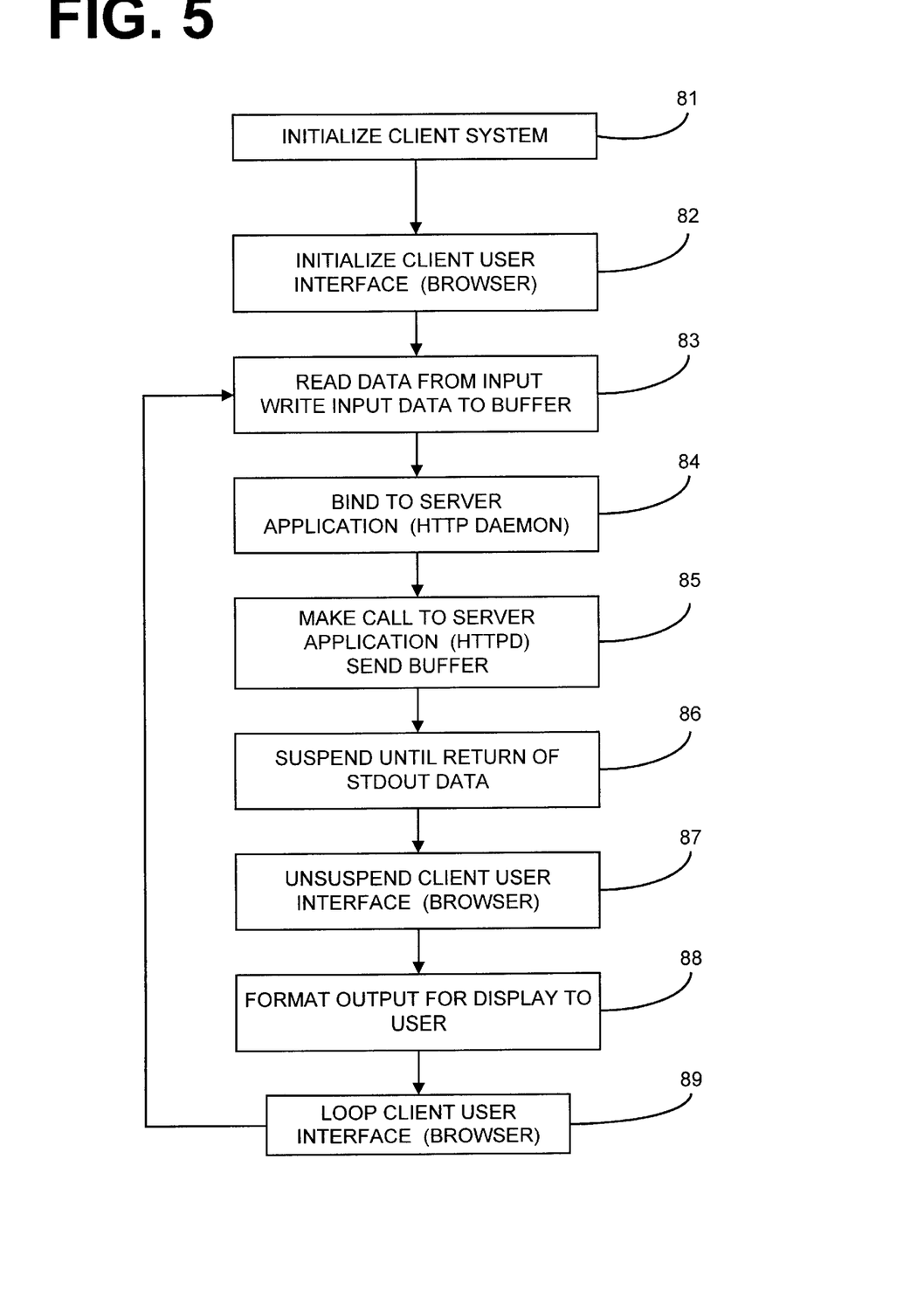
FIG. 5 is a flow chart of the process for the client browser in FIG. 4, in accordance with the present invention.

The process of the browser program 100 that occurs in the client system is illustrated in FIG. 5. The first step of the browser program 100 is to initialize the browser program 100 at step 81. The browser program 100 receives the request for service from the user at step 82. The browser program 100 then reads the data from the request for service and writes the input data to a buffer at step 83. The browser program 100 next binds to the server application 120 at step 84. The browser program 100 makes a call to the server application 120 and sends the buffer data at step 85 to the server application 120. The browser program 100 is then suspended until the return of data at step 86. When data is returned to the client user interface, the browser program 100 is resumed at step 87 and the browser program 100 writes the data received from server application 120 to the output to the client application program 140 at step 88. At step 89, the browser program 100 then loops to step 83 and suspends itself until a new request is received.

Figure 6:
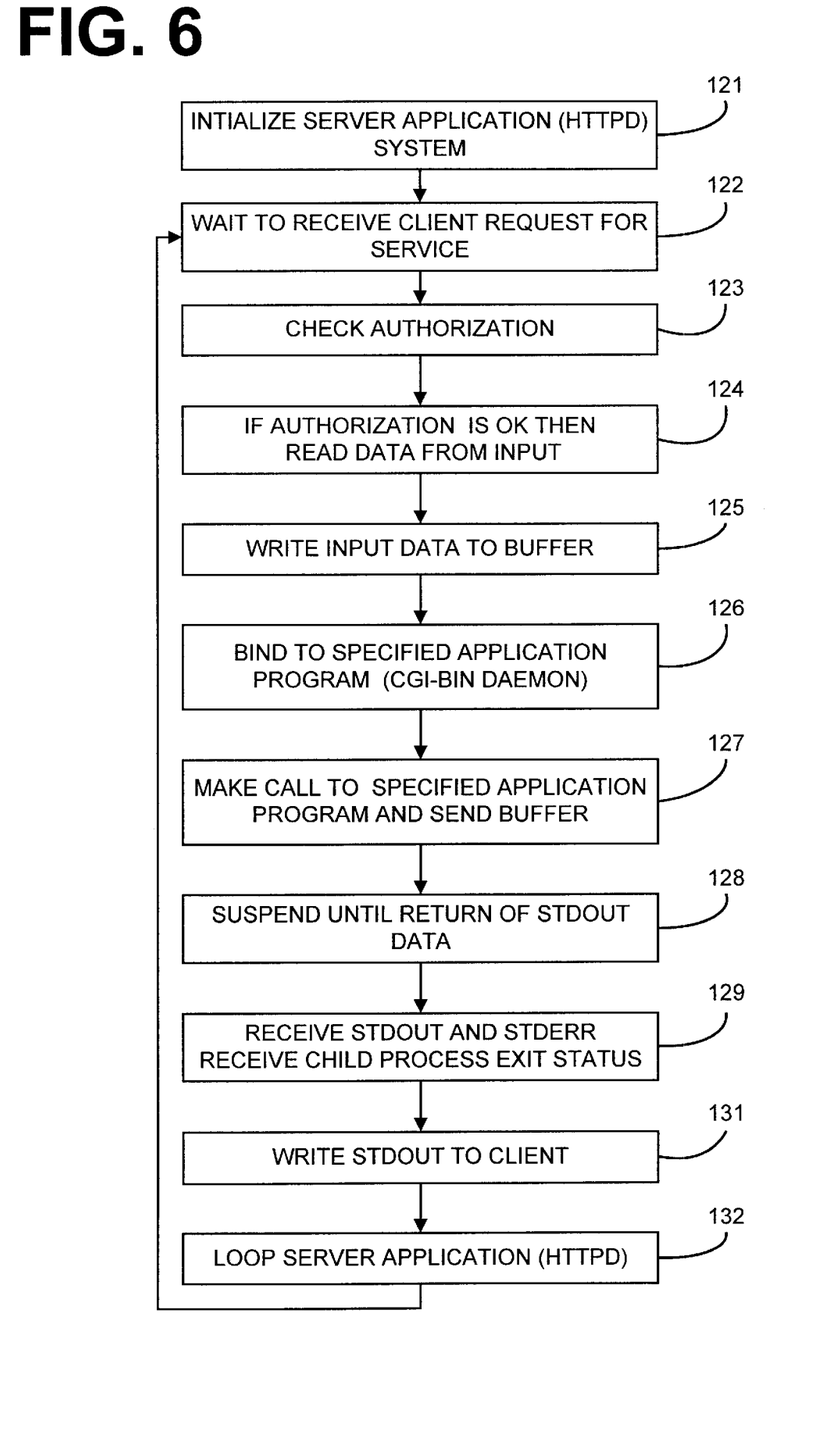
FIG. 6 is a flow chart of the process for the server's server application shown in FIG. 4, in accordance with the present invention.

The flow diagram of the process for the server application 120 illustrated in FIG. 6. The server application 120 is initialized at step 121. The server application 120 then waits to receive a client request for service at step 122. When a client request is received at step 122, the server application 120 checks the authorization of that client to insure that the client requesting service is authorized to access the functionality the client has requested at step 123. Next, if the authorization is satisfied, then the server application 120 reads the data input from the browser program 100 at step 124. The server application 120 writes any input data to a buffer at step 125. The server application 120 then determines which application program 140 will provide the service requested by the client system at step 126, and the server application 120 binds to the specified application program 140. The server application 120 then invokes the specified application program 140 and sends the necessary data in the buffer at step 127. The server application 120 process is suspended at step 128 until output data is received from the specified application program 140.

When the output data is received from the specified application program 140, the server application 120 receives the output and error statuses of the application program 140, and receives the exit status of application program 140 at step 129, where the exit status of application program 140 is set up to always exit with the same status as of the Java child server 180. The server application 120 next writes the output received from the application program 140 and returns that output to the client requesting service at step 131. The server application 120 then exits that session at step 132 and loops back to step 122, and suspends itself until a new request is received.

Figure 7:
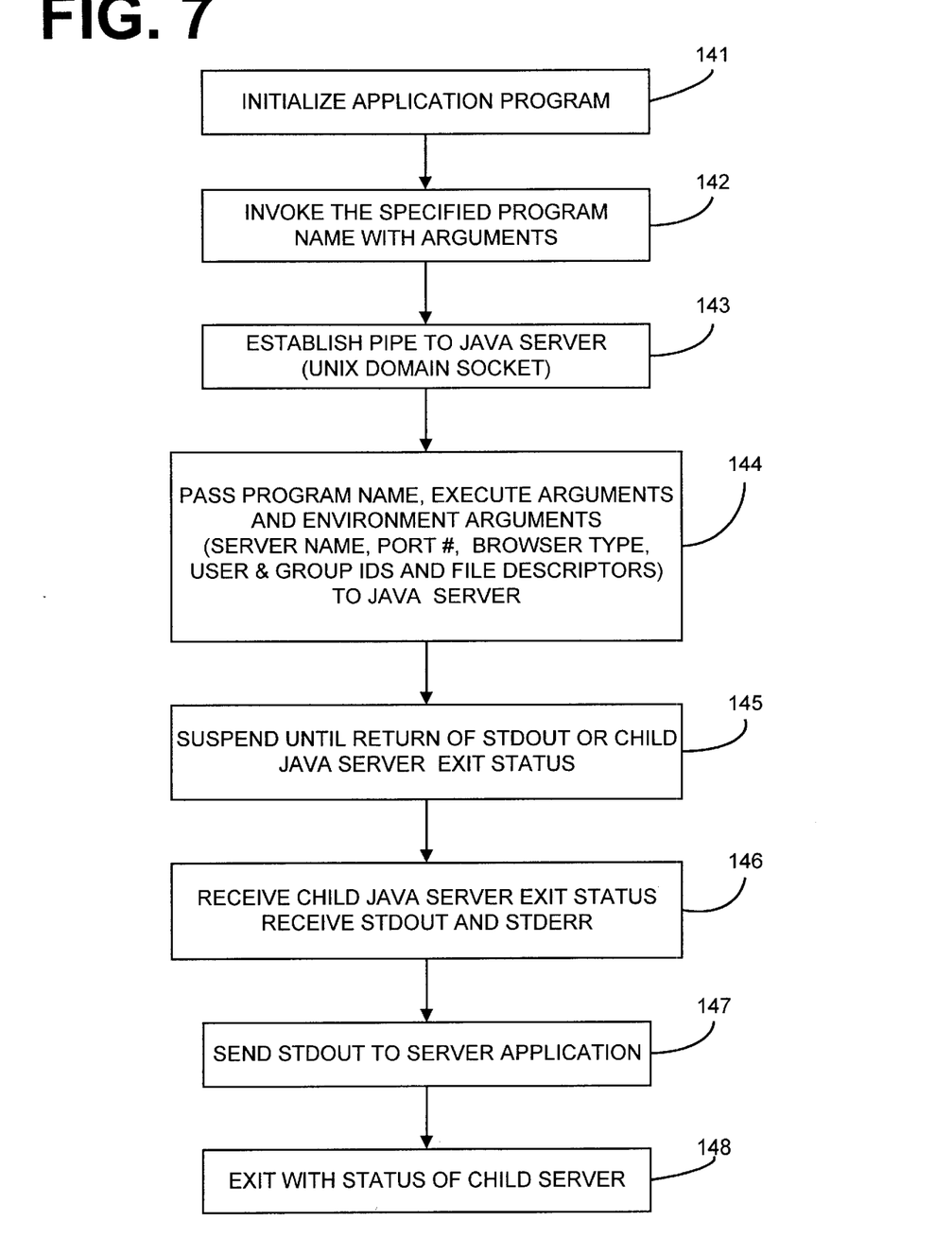
FIG. 7 is a flow chart of the process for the service application program shown in FIG. 4, in accordance with the present invention.

The flow diagram for the application program 140 is illustrated in FIG. 7. As noted above, the application program 140, by moving the code that was in the individual Java CGI-BIN scripts into one Java server 160, can be executed much faster because the individual CGI-BIN scripts are replaced by an object file (the proxy) that calls the daemon process to execute the code that would be in the Java CGI-BIN script on the proxy's behalf. Preferably, the proxy is written in C or C++ for faster execution.

First, the application program 140 is initialized at step 141. The application program 140 receives the request for the specified service with the program name and arguments at step 142. The application program 140 establishes a pipe connection to the necessary Java server 160 at step 143. Preferably, a Unix domain socket is established to generate the pipe connection.

The application program 140 passes the specified program name, execution argument and environment arguments that include, but are not limited to, the server name, port identification number, browser type, user and group identification numbers, and file descriptors, to the identified Java server 160 to provide the requested service at step 144. The application program 140 suspends processing until the return of data at step 145. After data is received from the server, the application program 140 unsuspends itself to receive the data and error output of the child Java server 180 and to receive any exit status at step 146. The application program 140 takes the output of the Java server 160 and returns it to the server application 120 at step 147. The application program 140 then terminates its execution with the exit status of the child Java server 180 process at step 148.

Figure 8:
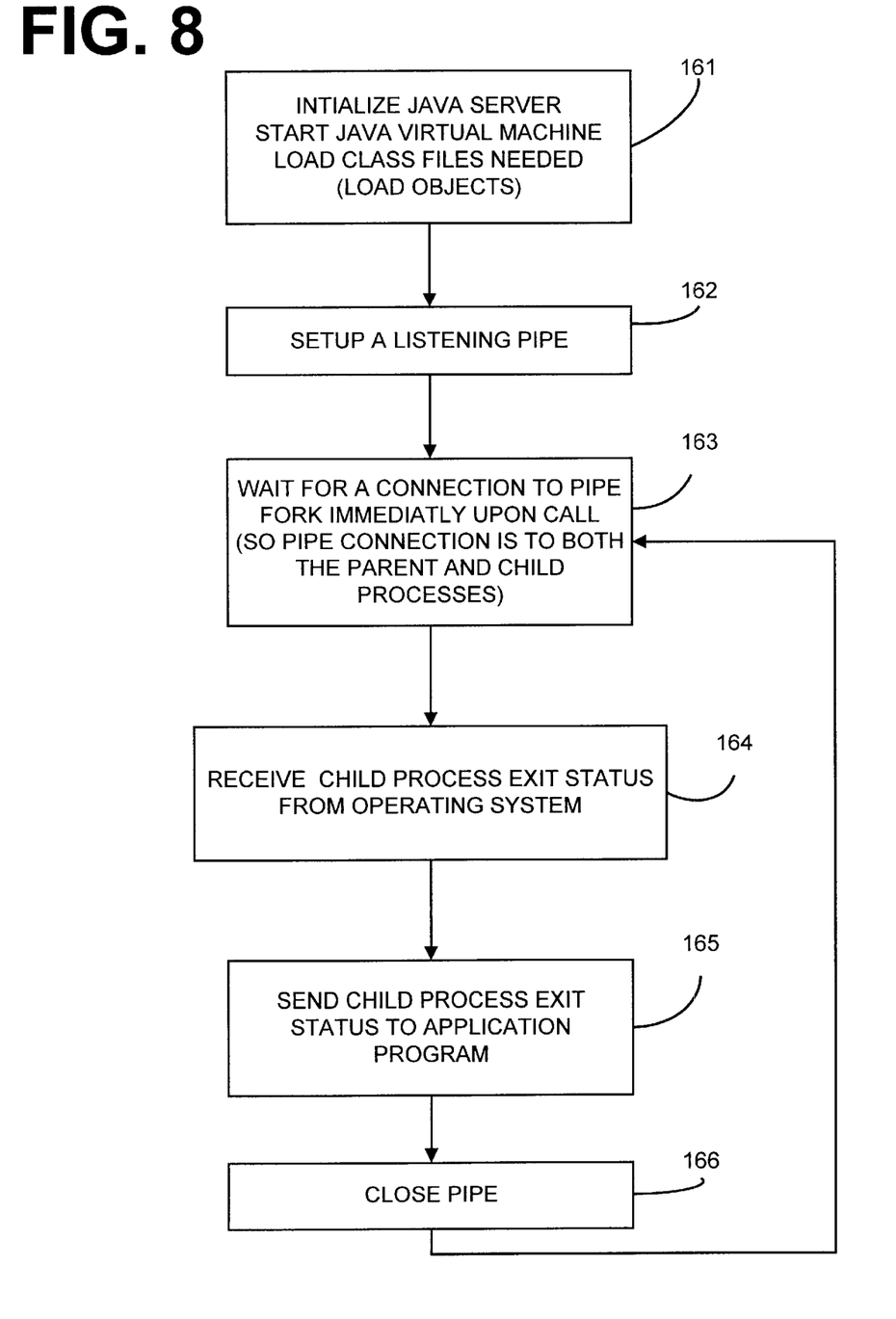
FIG. 8 is a flow chart of the process for the Java server shown in FIG. 4, in accordance with the present invention.

The process of the Java server 160 will now be discussed with respect to FIG. 8. First, the Java server 160 is initialized at step 161, and then waits to be called. The initialization step 161 includes starting the Java virtual machine and loading the standard class files needed for Java application execution. A listening pipe is setup to receive requests for service calls and the Java server waits to receive a call in step 162.

Immediately upon being called by the application program 140, the Java server 160 forks a process of the child Java server 180 with the pipe connection, thereby establishing communication with the application program 140, with Java server 160 and with the process of the child Java server 180 at step 163. The Java server 160 then waits to receive the exit status from the process of the child Java server 180 that is forked to provide the requested service at step 164. The exit status of the process of the child Java server 180 is sent to application program 140 over the pipe at step 165. The process is returned to the wait state at step 163 to wait for the next pipe connection to be established.

As noted above, the C program language is often used to write and implement the application program 140 (i.e., Java CGI-BIN scripts). These scripts normally are invoked by the HTTP daemon to do a single job and then they exit. The problem with using Java in the CGI-BIN script is that the objects (i.e. classes) are loaded and the Java code is interpreted every time the Java CGI-BIN script is executed. When the size of the Java CGI-BIN scripts becomes large, the amount of time spent loading objects and interpreting the Java code can limit performance.

In accordance with the present invention, the Java server 160 increases execution performance by forking itself and then having the process of the child Java server 180 run the already loaded code for the specific CGI-BIN script. The advantage of doing this is that the Java code in the process of the parent Java server 160 is loaded only once when the Java server 160 is started. In accordance with the present invention, it has been determined that, with large Java scripts, it is faster to connect up to the Java server 160 and have it fork a child and execute the correct code than to load and execute the correct code.

Figure 9:
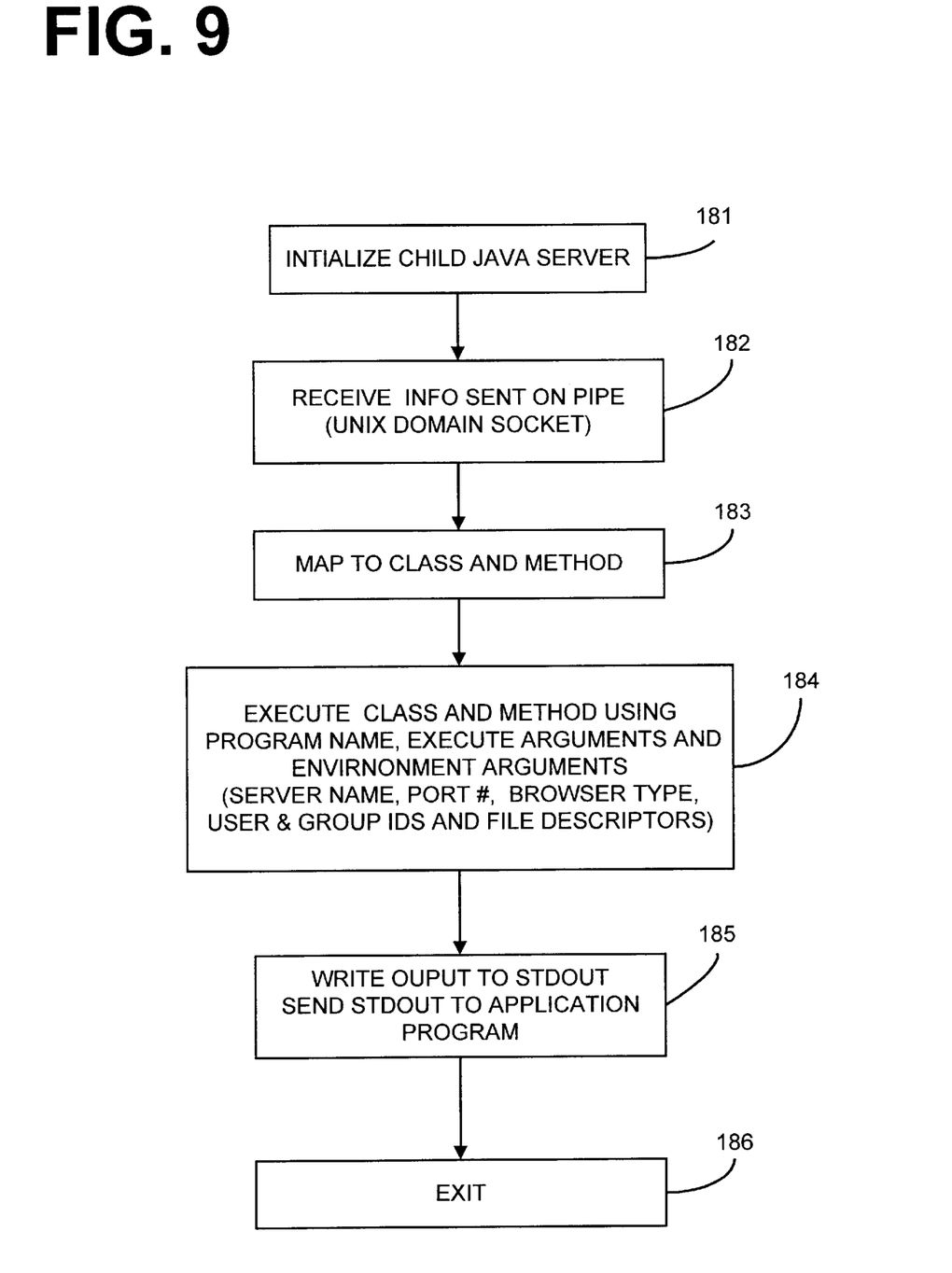
FIG. 9 is a flow chart of the process for the child Java server process shown in FIG. 4, in accordance with the present invention.

The process of the child Java server 180 is illustrated in FIG. 9. The child Java server 180 is initialized at step 181. The child Java server 180 receives the information sent on the pipe connection created by the application program 140 at step 182. The child Java server 180 then maps, at step 183, to the specified application (i.e., class and method) identified in the information that was communicated over the pipe connection and received at step 182. The child Java server 180 then executes the specified application (i.e., class and method) using the specified program name, execution arguments, and environment arguments present in the information received on the pipe connection at step 184. The data output and error status of the specified execution application (i.e., class and method) is moved to the stdout and stderr fields at step 185 for return to the application program 140. The child Java server 180 then exits at step 186.

In an alternative embodiment, the data output and error status of the specified execution application 180 (i.e., class and method) is moved to the stdout and stderr fields at step 185 for return to the server application 120. The child Java server 180 then exits as described above at step 186.

The foregoing description has been presented for purposes of illustration and description. It is not intended to be exhaustive or to limit the invention to the precise forms disclosed. Persons skilled in the art will understand that modifications or variations are possible in light of the above teachings. The preferred embodiment discussed was chosen and described to provide the best illustration of the principles of the invention and its practical application to thereby enable one of ordinary skill in the art to utilize the invention in various embodiments and with various modifications as are suited to the particular use contemplated. It will be understood by those skilled in the art that all such modifications and variations are within the scope of the invention.

What is claimed is:

1. A computer system for increasing performance of java application execution, comprising:

a server computer device; and first logic, within said server computer device, configured to maintain a java program in an initialized state, and when said java program is executed, said first logic forks a child logic to perform a required task leaving said java program maintained by said first logic in said initialized state and ready for subsequent execution.

2. The computer system of claim 1, wherein said first logic is executed by a client computer device.

3. The computer system of claim 1, further comprising:

second logic configured to determine an address of said first logic and cause execution of said first logic.

4. The computer system of claim 3, further comprising:

a third logic configured to dispatch a specific second logic from a plurality of second logic.

5. The computer system of claim 1, wherein said first logic maintains said java program in said initialized state by starting a Java virtual machine and loading standard class files needed for execution of said java program.

6. A computer system for increasing performance of interpreted languages execution, comprising:

a server mechanism for finding a specified application mechanism from a plurality of application mechanisms, to satisfy a client browser mechanism request to perform a required task, and said server mechanism for invoking said specified application mechanism;

said specified application mechanism for finding and executing a specified Java server mechanism from a plurality of Java server mechanisms to satisfy the client browser mechanism request to perform the required task; and said Java server mechanism residing in a server memory, said Java server mechanism for forking a child process to satisfy the client browser mechanism request to perform the required task and leaving said Java server mechanism in an initialized state and ready for subsequent execution.

7. A method for use in a computer system for increasing performance of interpreted languages execution, the method comprising:

providing a server computer device; and maintaining a java program in an initialized state, within said server computer device; and forking a child process to perform a required task when said java program is executed leaving said java program in said initialized state and ready for subsequent execution.

8. The method of claim 7, further comprising:

executing the java program by a client computer device.

9. The method of claim 7, further comprising:

determining an address of said java program by a second logic; and causing the execution of said java program by said second logic.

10. The method of claim 7, further comprising:
determining a specific second logic from a plurality of second logic to cause the execution of said java program.

11. The method of claim 7, further including the step of:
starting a Java virtual machine; and
loading standard class files needed for execution of said java program.

12. A computer system for increasing performance of interpreted languages execution, comprising:
means for providing a server computer device; and
means for maintaining a java program in an initialized state, within said server computer device; and
means for forking a child process to perform a required task when said java program is executed leaving said java program in said initialized state ready for subsequent execution.

13. The computer system apparatus of claim 12, further comprising:
means for executing the java program by a client computer device.

14. The computer system apparatus of claim 12, further comprising:
means for determining an address of said java program; and
means for causing the execution of said java program.

15. The computer system apparatus of claim 12, further comprising:
means for finding a specific determining means from a plurality of determining means to cause the execution of said java program.

16. The computer system apparatus of claim 12, wherein said maintaining means further comprises:
a means for starting a Java virtual machine; and
a means for loading standard class files needed for execution of said java program.

* * * * *